United States Patent [19]

Martin et al.

[11] Patent Number: 5,458,665
[45] Date of Patent: Oct. 17, 1995

[54] APPARATUS FOR FILTERING GASES

[75] Inventors: Gary Martin, San Diego, Calif.; Pekka Lehtonen, Karhula, Finland

[73] Assignee: A. Ahlstrom Corporation, Karhula, Finland

[21] Appl. No.: 89,814

[22] Filed: Jul. 12, 1993

[51] Int. Cl.⁶ .................................................. B01D 46/00
[52] U.S. Cl. ............................ 55/302; 55/341.5; 55/424; 55/523; 95/280
[58] Field of Search ..................... 95/272, 280; 55/302, 55/341.3, 341.5, 341.6, 391, 423, 424, 441, 466, 523

[56] References Cited

U.S. PATENT DOCUMENTS

| | | | |
|---|---|---|---|
| 3,375,058 | 3/1968 | Peterson et al. .......................... | 55/442 |
| 3,606,737 | 9/1971 | Lefevre ..................................... | 55/441 |
| 3,951,627 | 4/1976 | Barr, Jr. et al. . | |
| 4,343,631 | 8/1982 | Ciliberti ................................... | 55/302 |
| 4,395,269 | 7/1983 | Schuler .................................... | 55/302 |
| 4,419,113 | 12/1983 | Smith . | |
| 4,486,201 | 12/1984 | Noguchi ................................... | 55/302 |
| 4,521,231 | 6/1985 | Shilling . | |
| 4,525,184 | 6/1985 | Tassicker . | |
| 4,655,805 | 4/1987 | Krantz ..................................... | 55/302 |
| 4,737,176 | 4/1988 | Lippert et al. . | |
| 4,764,190 | 8/1988 | Israelson et al. ........................ | 55/269 |
| 4,765,809 | 8/1988 | Reichel et al. . | |
| 4,793,292 | 12/1988 | Engstrom et al. ....................... | 122/4 D |
| 4,830,749 | 5/1989 | Okamoto et al. . | |
| 4,869,207 | 9/1989 | Engstrom et al. ....................... | 122/4 D |
| 4,904,287 | 2/1990 | Lippert et al. . | |
| 4,969,937 | 11/1990 | Tassicker . | |
| 4,973,458 | 11/1990 | Newby et al. . | |
| 4,973,459 | 11/1990 | Lippert et al. . | |
| 5,066,315 | 11/1991 | Haberl et al. ............................ | 55/302 |
| 5,078,760 | 1/1992 | Haldipur et al. ........................ | 55/302 |
| 5,110,331 | 5/1992 | Williams ................................. | 55/302 |
| 5,114,581 | 5/1992 | Goldsmith et al. ..................... | 210/650 |

FOREIGN PATENT DOCUMENTS

| | | | |
|---|---|---|---|
| 1003765 | 1/1977 | Canada .................................. | 55/341.5 |
| 078678 | 10/1982 | European Pat. Off. . | |
| 347620 | 5/1989 | European Pat. Off. . | |
| 357931B1 | 7/1989 | European Pat. Off. . | |
| 035731A1 | 3/1990 | European Pat. Off. ............... | 55/341.6 |
| 2053778 | 5/1972 | Germany ............................... | 55/302 |
| 2826510 | 1/1979 | Germany ............................... | 55/302 |
| 3408627 | 9/1985 | Germany . | |
| 2019740 | 11/1979 | United Kingdom ................... | 55/302 |

*Primary Examiner*—C. Scott Bushey
*Attorney, Agent, or Firm*—Nixon & Vanderhye

[57] ABSTRACT

Gas with entrained particles, such as high temperature and pressure gas from a pressurized circulating fluidized bed reactor, is filtered using a vessel having a gas inlet, cleaned gas outlet, and filtered particles outlet. A pulse of cleaning gas is periodically or intermittently directed to the filters to dislodge particles which have been filtered and collected on the filters. Shrouds, having tubular, parallelepiped, zig-zag, or honeycomb configurations, are provided surrounding relevant portions of the filters to prevent dislodged particles from being entrained in gas passing to other filters, and instead directing the dislodged particles toward the vessel particles outlet. The shroud walls may have openings in them which allow gas to be filtered to pass through them, but prevent dislodged particles from passing through the openings. The filters may be mounted in hollow tubular or parallelepiped ducts in such a way that the ducts have smooth outer walls, and the shrouds may be substantially concentric with the ducts. When individual cleaning gas pulsing devices are associated with filters, the shrouds may include separate impingement and material collecting portions.

18 Claims, 6 Drawing Sheets

APPARATUS FOR FILTERING GASES

BACKGROUND AND SUMMARY OF THE INVENTION

This invention relates to an apparatus for filtering gases and a method of operating an apparatus for filtering gases. More specifically the present invention relates to an apparatus and a method for filtering gases containing solid contaminants and for efficiently removing accumulated solids from the filtering elements in a safe manner.

In various modern applications, the efficiency of filtering devices is required to be extremely high, however the pressure drop over the filtering devices must not exceed a certain predetermined level. Thus there is an increasing need for more and more effective cleaning systems for the filters. Also durable high temperature systems are required for some applications. One such application is a Pressurized Fluidized Bed combustor connected to gas compressor/ turbine system. In order to be able to use a solid fuel, such as coal or peat, for generating pressurized hot flue gases to be expanded in a gas turbine, one must have appropriate means to prevent the carry over to the turbine of particles from combustion of such solid fuels. An efficient system for filtering the gases would permit the use of such fuels.

Removal of the particulates from combustor exhaust gas effluent streams leading to a turbine can prolong the life of turbine blades and thus increase the reliability and efficiency of the whole process involved. Also, in some cases, governmental regulations relating to emissions permitted provide further impetus for commercialization of a system for filtering contaminated gases more efficiently.

It is known in the prior art to use various kinds of filters, such as bag house filters or ceramic filters for hot environments, in order to remove particulates from a gas stream. It is also essential to have the filter cleaned, e.g. after certain pre-determined operating periods in order to maintain the desired cleaning efficiency and pressure reduction of the gas over the filter. Commonly used methods of cleaning the filter employ a reverse directional pulse of gas for flushing the filter. This kind of method is disclosed e.g. in U.S Pat. No. 4,764,190. The filter elements are cleaned by use of a back pulse manifold that directs a pulse of gas flow into the filter elements in a direction opposite to normal direction of gas flow to be filtered, thus dislodging the accumulated cake (solids previously separated from the gas).

Also, in European patent 0 057 251 there is disclosed a filter having plurality of filter elements supported by a tube sheet, each filter element having an open top and disposed in apertures of the tube sheet extending into a lower chamber of the filter. There is also disclosed a system for back flushing the filter elements. The filter elements are cleaned by a pulse of high pressure gas from a gas delivery pipe; with the help of a venturi the gas pulse pulls additional gas from the immediate vicinity and increases the total amount of the cleaning gas, improving the cleaning effect. Further it is stated, that the system can include features which alleviate any undesirable interaction between the dirty gas entering the vessel and the downwardly flowing purged particles. According to the reference the inlets for gas to be cleaned are positioned high in the vessel, to promote a generally downwardly flow. EP 0 057251 discloses also a baffle having perforations in an upper section thereof, which baffle is disposed to form an annular space between a wall of the vessel, and the baffle functions to equalize the inlet flow of the gas to be distributed evenly to the filter elements, thus the gas flow is arranged to be generally downwardly near the inner surface of the baffle. The baffle extends from the bottom of the vessel to the upper section thereof.

EP-BI-0 078 678 discloses dislodging the partuculates from a filtering fabric by using an induced gas flow on the upstream (outer) side of the filter element. The gas is forced to circulate upwards along the outer surface of the filter fabric. Although the method may be feasible to some extent, the suggested inducement of the gas surrounding the filter element may introduce further difficulties by not allowing the dislodged particles to fall down.

Back pulse flushing is commonly practised so that only one or a few filters are cleaned at the same time while the others are in a normal usage mode, in order to ensure proper operation of the process while still maintaining the pressure reduction within a permitted range. When activating the back pulse system for cleaning a filter during a cleaning mode, the gas pulse is introduced into the filter causing the cake of particulate material accumulated on the surface of the filter to dislodge and to be entrained in a surrounding gas space by the force of the back pulse. However, since there are filters in normal usage in the vicinity of the pulsed filter, the dislodged particulates may be strongly entrained by those gases and carried into another filter. Thus the efficiency of the whole filtering device deteriorates. This causes a number of further difficulties, e.g. the sequence of flushing the filters must be multiplied causing a decrease in efficient filtering area available for filtering, and the density of particulates in the gas is generally increased in a filtering plenum, causing unnecessary abrasion of surfaces (which can lead to still further problems if cooled constructions are used in the filter assembly).

According to the invention, a method and apparatus are provided which substantially prevent particles which have been filtered out of a gas stream and collected on a filter from being entrained in a gas stream passing into association with another filter, as often happens in the prior art. Instead, the particles dislodged from a filter by a pulse of cleaning gas are directed to the particles outlet of the associated vessel containing the filters. By doing this, the invention achieves enhanced efficiency compared to the prior art.

According to one aspect of the present invention, a gas filtering apparatus is provided comprising the following elements: A hollow vessel having an inlet for gas with entrained particles to be filtered, an outlet for filtered gas, and an outlet for particles filtered from the gas, a first plenum for gas to be filtered, and a second plenum for filtered gas. At least one filter element disposed in the vessel between the first and second plenums, and containing at least one filter for filtering particles from gas. Means for introducing a pulse of cleaning gas to the filter for dislodging particles filtered by the filter which have collected on the filter, so that the particles may pass through the particle outlet of the vessel. And, shroud means associated with the filter element for preventing re-entrainment of particles dislodged by the pulse of cleaning gas in a stream of gas to be filtered.

Preferably a plurality of different filter elements, each having a plurality of filters associated therewith, are provided. The filter elements may be tubular or parallelepiped ducts which mount generally tubular (e.g. tubular or parallelepiped) filters (such as ceramic candle filter tubes, monolithic ceramic filers, fabric fibers in tubular configuration, etc.) so that the outer surface of the duct, surrounded by the shroud means, is substantially smooth, so that dislodged particles readily flow downwardly along it. The shroud means may comprise shroud walls in a honeycomb configuration, or individual parallelepiped or tubular shrouds substantially concentric with associated ducts, or zig-zag partition walls. The shroud walls may have openings therein which allow the passage of gas, but prevent the passage of dislodged particles.

Individual cleaning gas pulsing jets may be associated with the filters, and the associated shrouds may take the form of structures having an impingement portion at least as wide as the effective surface of the filter from which particles will be dislodged, and a material collecting portion.

In order to maintain the gas velocity within a desired range the gap between the shroud and the filter elements is designed to provide a desired gas velocity. Further, it is advantageous to dispose the cluster of filter elements so that the cluster comprises of a duct supported by a supporting plate, the supporting duct also functioning as a fluid communication path for gases, and a plurality of filter elements attached to the duct preferably in a manner which provides an annular volume between the shroud and the supporting duct which facilitates downward movement of the dislodged solids. This is preferably accomplished by mounting the filters to the duct so that they are substantially enclosed by the duct, with the filters attached to the duct in the vicinity of the portion of each filter which receives the gas to be purified. Thus the falling solids are allowed to slide smoothly along the surfaces of the shroud and the duct, not accumulating on the surfaces of the filters.

The shroud may be made of various materials, depending on the requirements of the environment. When filtering gases of high temperature, e.g. 1200° C., a high temperature resistant material, such as high temperature metal or a ceramic material, is required.

It may be advantageous in some applications, e.g. when the wall of the shroud is solid, to have the diameter of the shroud vary in order to equalize the gas velocity in the volume between the filter and the shroud, one alternative is to form the shroud in conical shape, so that the diameter increases from the midpoint towards the upper and lower ends of the shroud, i.e. to provide a generally hourglass shape to the shroud. This is desired when the gases enter the volume between the shroud means and the filter through both ends, which is preferred since it provides even distribution of the gases over the filter area. Alternatively, the shroud may be provided with openings, formed so that the downwardly flowing dislodged particles are not allowed to exit the shroud.

Since the solids are easily entrained by the gases in the vessel, it is preferred to have at least one of the shrouds extend farther on its lower end than the others. That particular feature ensures that the upper level of a cloud of solids in the lower section of the first plenum is low enough not be influenced by the gas flow to the filters during normal operation.

According to another aspect of the present invention, apparatus for filtering gas is proved which comprises the following elements: A hollow vessel having an inlet for gas with entrained particles to be filtered, an outlet fro filtered gas, and an outlet for particles filtered from the gas, a first plenum for gas to be filtered, and a second plenum for filtered gas. A plurality of filter elements, each comprising a hollow duct, and each hollow duct mounting a plurality of individual filters therein, each individual filter for filtering particles from gas with entrained particles introduced into the gas inlet to the vessel. Means for introducing a cleaning gas pulse to the filters to dislodge particles separated from the gas with entrained particles which collect on the filters. And, a shroud surrounding portions of each of the hollow ducts adjacent the areas thereof from which particles will be dislodged for containing the dislodged particles and substantially preventing them from being entrained in gas, but rather directing the dislodged particles toward the vessel particles outlet.

According to yet another aspect of the present invention, a method of filtering gas is provided. The method comprises the following steps: (a) Introducing gas with entrained particles to be filtered into the vessel into operative association with the filters to filter particles from the gas, and discharging cleaned gas from the vessel. (b) At predetermined intervals, directing a pulse of cleaning gas toward at least some of the plurality of filters to dislodge filtered particles which have collected thereon. (c) Preventing the particles dislodged from the filters from being entrained in gas passing into association with other filters. And, (d) directing the dislodged particles so that they pass toward the particles discharge outlet. Step (b) is preferably practiced by directing a pulse of cleaning gas at only some of the filters, while other filters continue to operate to remove particles from gas passed therethrough, and may be practiced intermittently or periodically, for each of the filters. Step (c) is preferably practiced by providing a shroud surrounding the portions of each filter from which particles will be dislodged. Step (a) is preferably practiced to pass gas with entrained particles through openings in the shrouds, the openings being disposed so that dislodged particles will not pass therethrough, and is further practiced to pass gas with entrained particles at a pressure of between about 2–40 bar and at a temperature of between about 500°–1200° C. through the filters.

It is the primary object of the present invention to provide a method and apparatus, for filtering particles from gas, having enhanced efficiency by substantially preventing particles dislodged during cleaning of filters from being entrained in gas so that they have to be filtered out of the gas again. This and other objects of the invention will become clear from an inspection of the detailed description of the drawings, and from the appended claims.

DETAILED DESCRIPTION OF THE DRAWINGS

Figure 1:
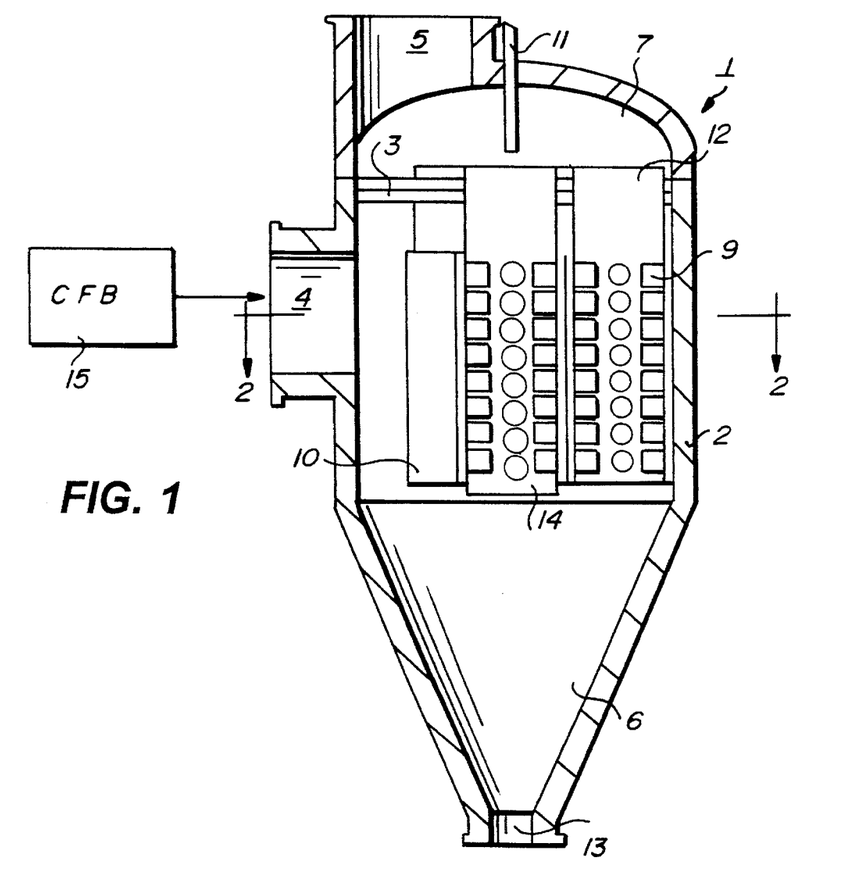
FIG. 1 is a side view, partly in cross-section and partly in elevation, of filtering apparatus using clusters of ceramic filter elements according to one exemplary embodiment of the invention.

Referring to FIG. 1, a filtering apparatus 1 according to one exemplary embodiment of the present invention comprises a hollow vessel 2 of a generally circular cross section having a generally horizontal support plate 3 dividing the vessel into two compartments or plenums, a first plenum 6, and a second plenum 7. An inlet 4 for gases to be purified and an outlet 13 for separated solids are in operative association with the first plenum 6. An outlet 5 is connected to the second plenum 7 for discharging cleaned gases therefrom. Clusters of filter elements 8 are provided in first plenum 6, supported by support plate 3, for filtering gas passing from first plenum 6 to second plenum 7.

An assembly 11 for introducing a pulse of cleaning gas into each of clusters of filter elements 8 is also provided. Each cluster of filter elements 8 comprises a duct 12 preferably forming a flow path for gases from the filter elements 8, attached to the duct 12, to the second plenum 7. The actual filters 9 within each cluster 8 are attached to the duct 12 at a gas receiving end thereof. The expression "gas receiving end" means that end of the filter 9 which receives the gases containing contaminants. Each filter 9 is preferably cylindrical or tubular and is actually attached substantially inside the duct 12, thus making the outside surface of the duct 12 as smooth as possible, so that effective, uninterrupted sliding of solids flushed from the elements 8 is thus ensured, and advantageous performance is obtained.

When a back pulse of gas (e.g. air) is provided by device 11, particles are discharged from the filters 9. In order to prevent those particles from contaminating filters 9 in other clusters 8, a shroud 10 is provided surrounding those portions of the filters 9 through which particles could be expelled and contaminate filters 9 of other clusters 8. In the embodiment illustrated in FIG. 1, the shrouds 10 surround the vertical surfaces of the tubular filters 9.

Since the surface of each filter 9 is considerably rough, especially the upper surfaces of each filter 9 could accumulate solids on them if the filters 9 were not attached according to the present invention. As illustrated in FIG. 1 the supporting duct 12 is a tubular member, but if more gas space is required between the duct 12 and a shroud 10 surrounding the vertical surfaces of the duct 12, a duct 12 of smaller diameter may be provided, with local extensions for every filter 9, which filters 9 are preferably mounted so that they are attached to the duct extensions on a gas receiving end of each filter 9, thus maintaining a smooth outer surface.

At least one of the shrouds 10 may extend farther towards the lower section of the first plenum 6 than the other shrouds 10, as indicated by reference numeral 14 in FIG. 1. This configuration is in order to ensure that the upper level of a cloud of solids in the lower section of the first plenum 6 is low enough not be influenced by the gas flow to the filters 9 during normal operation. Thus the overall filtering operation is more efficient.

As seen schematically at reference numeral 15 in FIG. 1, the inlet 4 may be connected up to a circulating fluidized bed reactor, or a like source of high temperature, high pressure gas with entrained particles. Typically, the pressure of the gases discharged from the CFB reactor 15 and fed to the inlet 4 to vessel 2 is between about 2–40 bar, and the temperature is between about 500°–1200° C. In this case, it is necessary for the filters 9 to be of ceramic or other high temperature resistant material, such as shown in U.S. Pat. Nos. 4,764, 190, 4,793,292, 4,869,207, or 5,114,581, e.g. ceramic candle tube filters, or monolithic ceramic filters in a generally tubular or paralellepiped configuration.

The gases to be filtered are introduced to the first plenum 6 via inlet 4, and are conveyed to the annular volume between each duct 12 and its associated shroud 10, preferably through both open ends of the shrouds 10. The gases to be filtered then pass to the clusters 8, and the gases are fed through the individual filters 9 to the interior volume of each duct 12 in order to separate the particulates from the gases. The cleaned gases enter the second plenum 7 and are discharged there from via outlet 5 for further processing.

When the assembly 11 for supplying a flushing/cleaning pulse of gas is activated, a gas pulse is introduced at least into one duct 12. Due to the reverse flow of gas through the filters 9, the accumulated solids are dislodged from each filter 9 to which the reverse pulse is applied. The dislodged solids impact the shroud 10 ensuring that the dislodged solids do not enter the gas streams flowing to other filter clusters 8. The dislodged solids are conveyed to the lower section of the vessel 2 to be removed via outlet 13.

Figure 2:
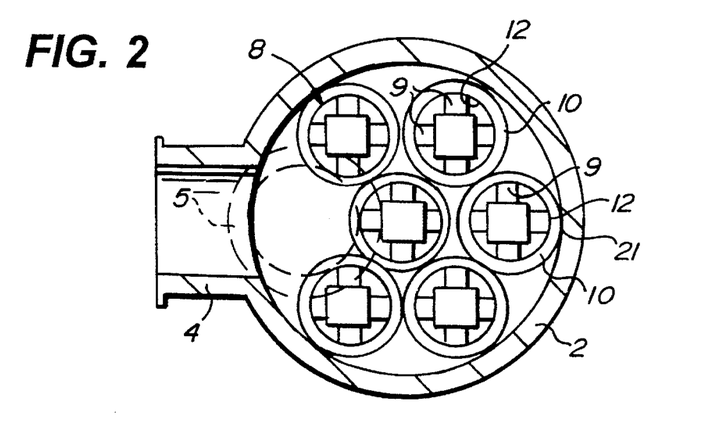
FIG. 2 is a cross-sectional view of the filtering apparatus of FIG. 1 taken along lines 2—2 thereof.

In FIG. 2 a filtering apparatus according to a preferred embodiment is shown illustrating an exemplary assembly of the clusters 8 of filters 9 in the vessel 2. Each filter 9 is attached to the tubular duct 12 at its gas receiving end, in this case totally inside the duct. Each shroud 10 is also tubular, having a slightly greater inside diameter than the outside diameter of the duct 12 with which it is associated, and is substantially concentric therewith and has a length sufficient to encompass all of the filters 9 associated with the duct 12. Each shroud 10 thus forms an annulus 21 between it and a duct 12.

Figure 3:
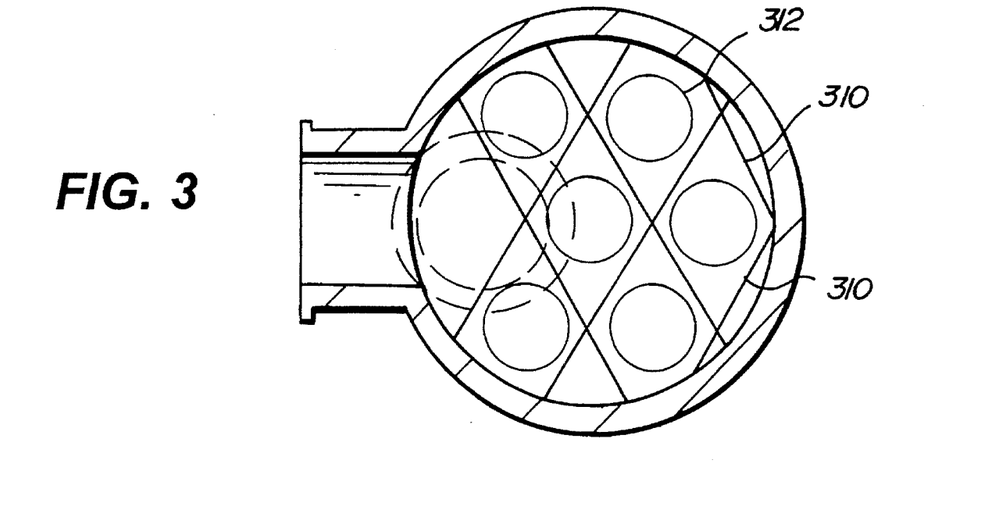
FIG. 3 is a view like that of FIG. 2 for a second embodiment of apparatus according to the present invention.
Figure 4:
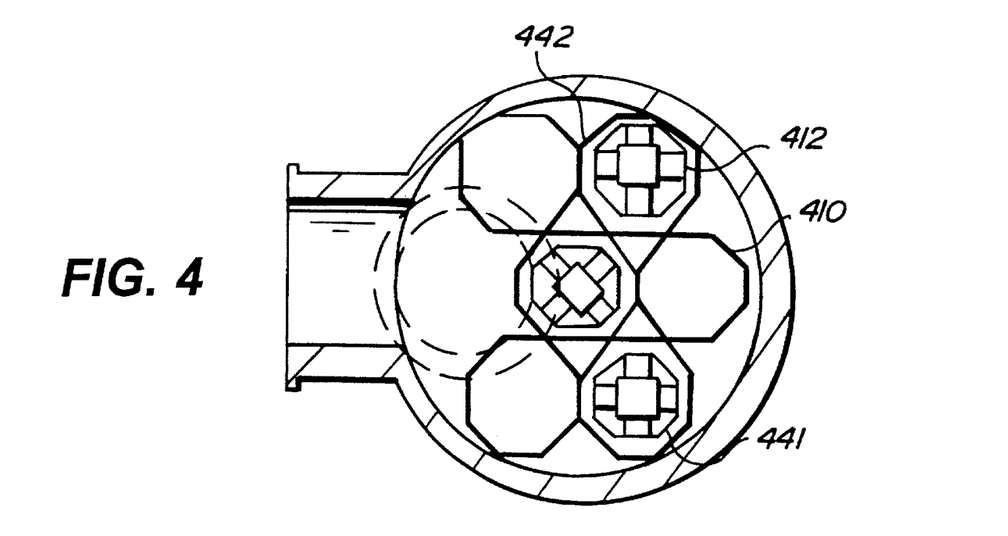
FIG. 4 is a view like that of FIG. 2 for a third embodiment of apparatus according to the present invention.

The shrouds 10 may also be formed of non-circular elements, as shown in FIGS. 3 and 4. For example each shroud 410 (see FIG. 4) may be have a cross-section of a polygon (e.g. be a hollow parallelepiped), thus enabling the usage of common walls 442 of two parallel shrouds 410. Each duct 441 may also have a cross-sectional configuration of a polygon, but the tubular form 412 is preferred. In some cases a form of a honeycomb or equivalent, as the shroud construction 310 in FIG. 3, may be advantageous, containing a generally tubular filter assembly 312 similar to the embodiment of FIGS. 1 and 2.

Figures 5, 6, 7:
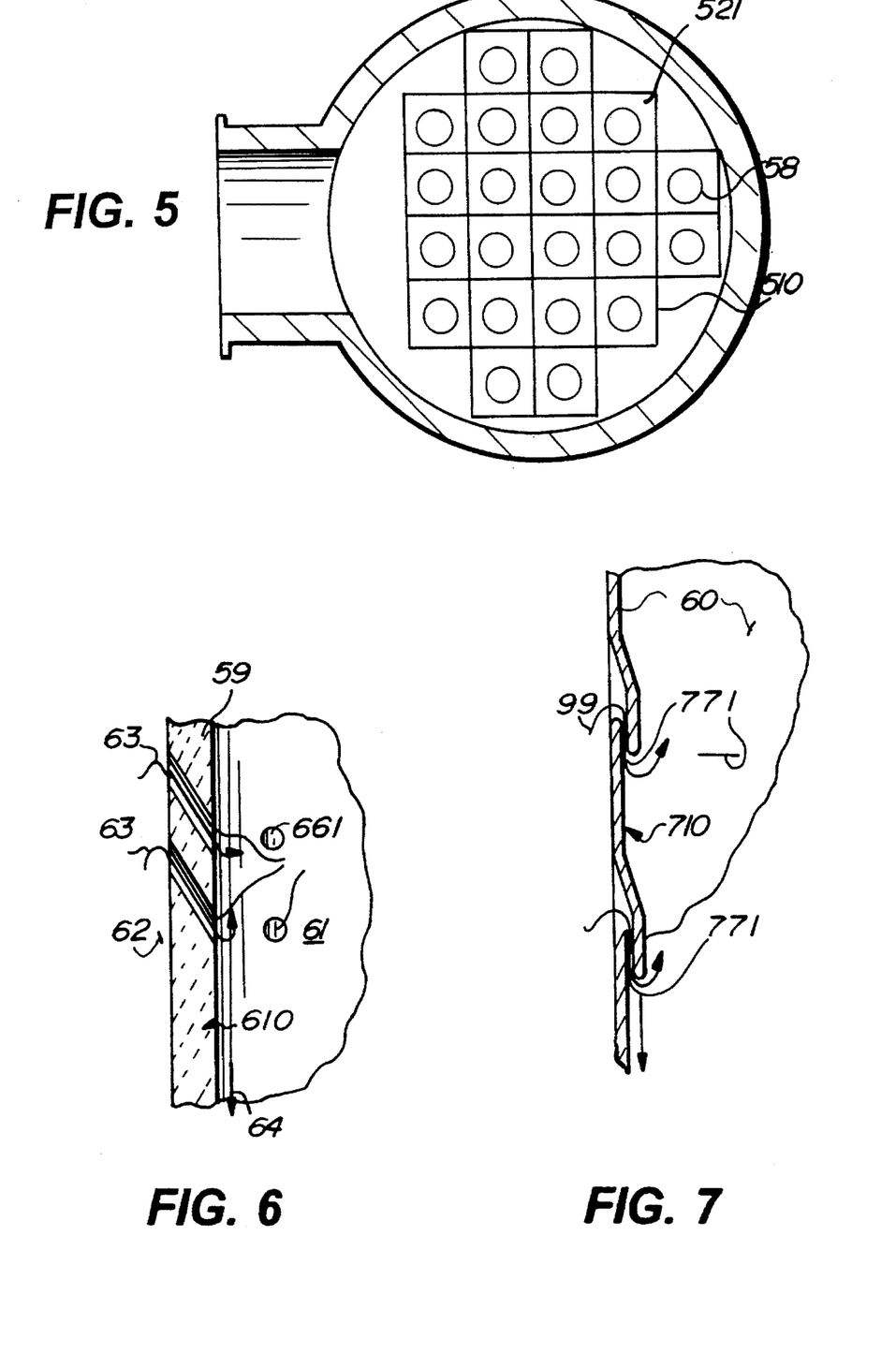
FIG. 5 is a view like that of FIG. 2 for a fourth embodiment of apparatus according to the present invention.
FIG. 6 is a detail longitudinal cross-sectional view of an exemplary shrouding means according to the present invention.
FIG. 7 is a view like that of FIG. 6 of a second construction of the shrouding means according to the present invention.

In FIG. 5 the shroud 510 is formed of a plurality of adjacent square shaped channels defining the space 521 between each filter 58 and the wall of the shroud. The filter 58 in this embodiment may be a ceramic candle tube, or a fabric back filter if the qualities of a rigid ceramic structure are not required.

In FIGS. 6 and 7, the constructions of walls 59, 60 of exemplary shrouds 610 and 710, respectively are illustrated. The shrouds walls 59, 60 have openings 661 and 771, respectively. In FIG. 6 the wall 59 is made of a refractory material such as ceramic material, and the openings 661 enhance the distribution of the gas being filtered (see arrows 63). The openings 661 are preferably directed so that the inner end of each opening 661, adjacent the interior 61 of shroud 610, is lower than the outer end, adjacent the exterior 62 of shroud 610. Thus falling solids dislodged by a blast of gas from apparatus 11 of FIG. 1 do not pass through the openings 661, but rather slide down wall 59 towards the lower section (e.g. 13 in FIG. 1) of the vessel (e.g. 2 in FIG. 1) as indicated by arrow 64. The openings 661 may be circular in cross-sectional, or slots.

In FIG. 7 the openings 771 are made by providing two bends in sequence in the metal wall 60 of shroud 710.

Figure 8:
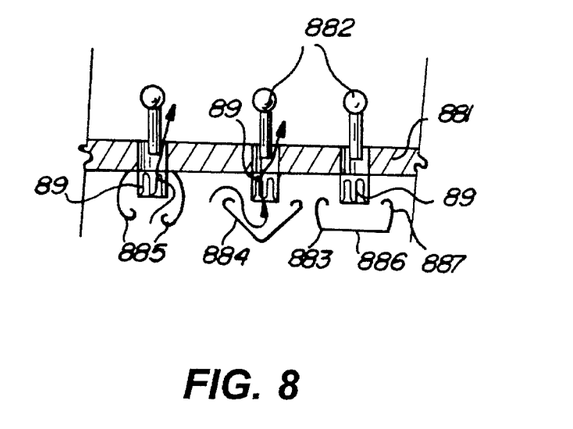
FIG. 8 is a detail top view, partly in cross-section and partly in elevation, of an exemplary filtering apparatus using clusters of ceramic filter elements mounted to a substantially vertical wall according to still another aspect of the present invention.

In FIG. 8 there is disclosed still another embodiment of the present invention. The filters 89 are attached to a substantially vertical wall 881 which may be cooled or non-cooled, in parallel, vertical rows, each row being provided with a back flushing assembly 882. The pattern of mounting the filters 89 with respect to the shrouding means 883–887 may vary according to the needs of a specific situation as long as the structure 883–887 perform their shrouding function.

As shown in FIG. 8, the shrouding means 883, 884 and 885 are disposed adjacent the area of each filter 89 discharging the solids during the cleaning mode operation. Shrouds 883 and 884 show two different solutions for filters having their gas receiving area at the end wall of the filter, but shrouds 885 may also be positioned at the sides of the filter 89 in case the gas receiving areas of the filter 89 are at its side walls. The shroud 883 is formed by an impingement portion 886 for receiving the solids flushed from the filter 89, and a material collecting portion 887 for collecting the solids and conveying the solids to the lower section of the vessel in which wall 881 is mounted. The material collecting portion 887 extends from the horizontal edges of the impingement portion 886, and the collecting portion 887 is preferably bent towards the filter 89 and is provided with a bayment arrangement at the edge of the material collecting portion 887 for preventing the solids from being entrained in the gas being filtered.

Figure 9:
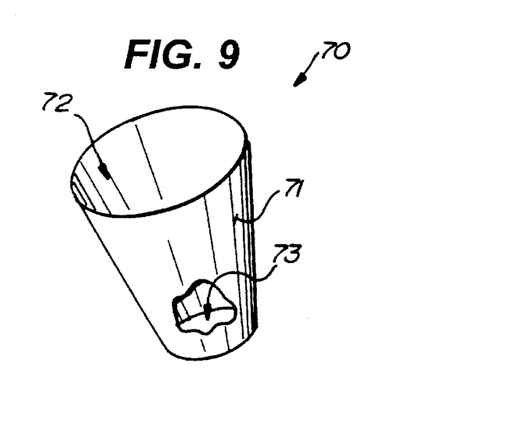
FIGS. 9 and 10 are perspective views of shrouds having conical or hourglass configurations.
Figure 10:
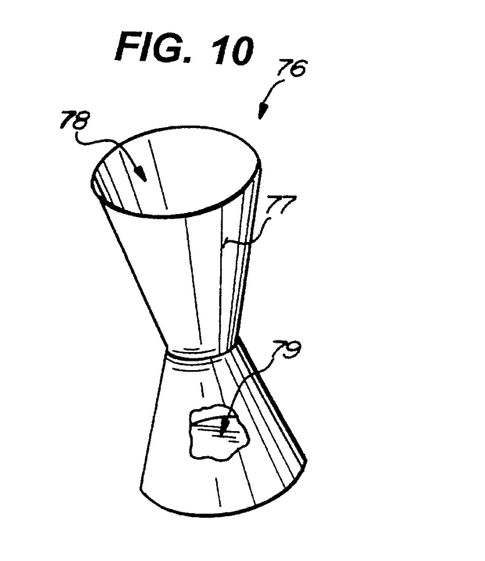

FIGS. 9 and 10 show two other possible configurations of shrouds that may be utilized according to the invention (e.g. in place of shroud 10 in FIGS. 1 and 2). The shroud 70 in FIG. 9 comprises a generally conical (truncated cone) wall 71 with open top 72 and open bottom 73, normally gas passing through open top 72 into the filters (not shown) within shroud 70, and particles discharged through 73. The shroud 76 in FIG. 10 has an hourglass-simulating shaped wall 77, with an open top 78 and open bottom 79 into both of which gas to be filtered flows, with particles passing through bottom 79 when dislodged from filters (not shown) within shroud 76.

Figure 11:
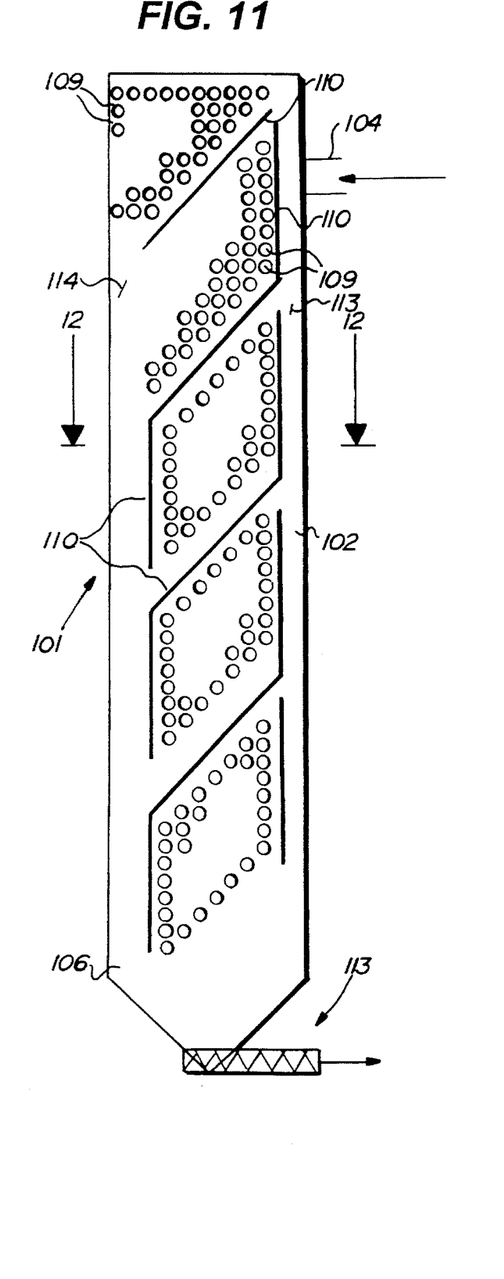
FIG. 11 is a side schematic view, with the near wall removed for clarity of illustration, of another embodiment of filtering apparatus according to the invention with a plurality of vertically spaced clusters of filter candles separated by shroud walls having a zig-zag configuration.
Figure 12:
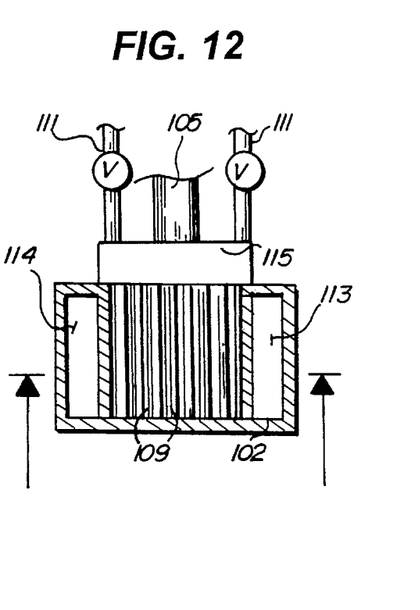
FIG. 12 is a schematic cross-sectional view of the apparatus of FIG. 11 taken along lines 12—12 thereof.

The apparatus of FIGS. 11 and 12 illustrates an invention embodiment having a different configuration of shrouds and filters than those illustrated earlier. The filtering apparatus 101 includes a generally vertical vessel 102 with a dirty gas inlet adjacent the top at one side communicating with the interior volume (including portion/plenum 113) of the vessel 102 surrounding the conventional ceramic filter candles 109 disposed horizontally therein in vertically spaced clusters 108. The gas passes through the filter candles 109 into the clean gas ducts/headers/plenums 115 (see FIG. 12) associated with one or more clusters 108, passing out the clean gas outlet 105 common to all of the ducts 115. A reverse pulse of cleaning gas is added by means 111 (see FIG. 12), periodically, intermittently, in response to a pressure buildup indicating clogging, etc. to dislodge filtered-out particles that have collected on the outer surfaces of the filters 109.

In FIGS. 11 and 12, the shrouds 110 are illustrated in the form of walls (e.g. high temperature resistant metal, or ceramic, or metal covered with ceramic), except for the uppermost and lowermost shrouds 110, the walls having a generally zig-zag configuration. The portion of each shroud 110 below a cluster 108—e.g. walls 112 in FIG. 11—is slanted with respect to the horizontal, downwardly toward the ash collector duct 114, to direct the flow of solids dislodged from the cluster 108 of filters 109 immediately thereabove toward the bottom 106 of the vessel 102, to ultimately be discharged through the filtered-out particles outlet 113.

Figures 13, 14:
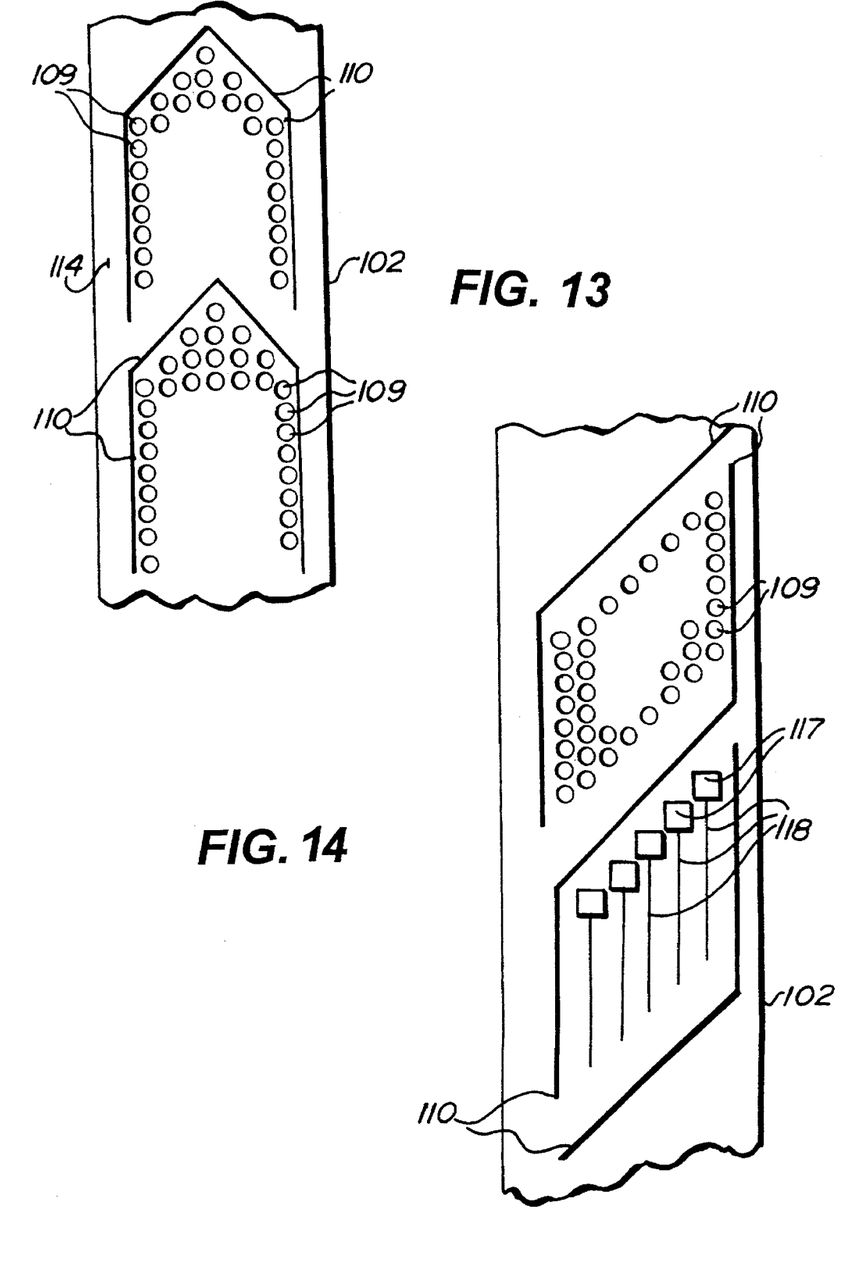
FIGS. 13 and 14 are detail views like that of FIG. 11 showing other arrangements of filter candles and shrouds according to still other aspects of the present invention.

FIGS. 13 and 14 show configurations like those in FIGS. 11 and 12, only having slightly different arrangements of the filters 109 and/or shrouds 110.

In FIG. 13, the horizontally disposed filters 109 in each cluster 108 are disposed in an arrow tip configuration, and thus the shrouds 110 covering them also have such a configuration, the walls 112 serving to call dislodged filtered-out solids from the next-above cluster 108 to flow downwardly toward the particles outlet 113.

In FIG. 14, the shrouds 110 are configured as illustrated in FIG. 11, however some of the filters have a different configuration. For the lower cluster 108 in FIG. 14, the ceramic filter candles 118 are disposed vertically, connected at the tops thereof to ducts 117, which in turn are connected to header 115, and ultimately to clean gas outlet 105.

Using the apparatus described above, a method of filtering particles from gas (e.g. high temperature and pressure gas from the pressurized CFB 15) is provided. The method comprises the steps of: (a) Introducing gas with entrained particles to be filtered into the vessel 2, 102 into operative association with the filters 9, 109, 118, etc. to filter particles from the gas, and discharging cleaned gas from the vessel (through outlet 5, 105). (b) At predetermined intervals (e.g. intermittently, periodically, in response to a back pressure indicating clogging, etc.), directing a pulse of cleaning gas toward at least some of the plurality of filters to dislodge filtered particles which have collected thereon. (c) Preventing the particles dislodged from the filters 9, 109, etc. from being entrained in gas passing into association with other filters (in other clusters 8, 108). And, (d) directing the dislodged particles so that they pass toward the particles discharge outlet (13, 113). Step (c) is preferably practiced by providing shrouds surrounding those portions of the filters 9, 58, 89 from which the particles will be dislodged, such as the shrouds 10, 110, 310, 410, 510, 610, 70, 70, 76, or 883–887. Discharge of particles from the vessel (2, through discharge 13) may be facilitated by mounting the clusters 8 etc. in ducts 12, 312, 412, etc. so that the outer surfaces of the ducts (surrounded by the shrouds 10, etc.) are substantially smooth so that particles will readily flow down them toward the particles discharge (13).

Thus it will be seen that according to the present invention a method and apparatus are provided which provide enhanced filtering efficiency by substantially avoiding having to separate a particle from the gas to be filtered more than once. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit

What is claimed is:

1. Gas filtering apparatus, comprising:

a hollow vessel having an inlet for gas with entrained particles to be filtered, an outlet for filtered gas, and an outlet for particles filtered from the gas, and a first plenum for gas to be filtered;

a second plenum for filtered gas;

a plurality of filter element clusters disposed in said vessel between said first and second plenums, and each containing a plurality of filters for filtering particles from gas;

means for introducing a pulse of cleaning gas to all of said filters within a cluster at the same time for dislodging particles filtered by said filters which have collected on said filters, so that the particles may pass through said particle outlet of said vessel; and shroud means including one or more substantially vertical walls substantially completely surrounding each said filter element cluster, said one or more substantially vertical walls being open at the top and bottom thereof, for preventing re-entrainment of particles dislodged from said filters of said cluster by said pulse of cleaning gas in a stream of gas to be filtered.

2. Apparatus as recited in claim 1 wherein a plurality of filter element clusters are mounted within said vessel, each having a plurality of filters associated therewith, and wherein said shroud means comprises a plurality of individual shrouds, one associated with each of said filter element clusters, and comprising means for preventing particles dislodged from one filter element from passing into operative association with another filter element.

3. Apparatus as recited in claim 2 wherein said filter element clusters are mounted within said vessel so that they are vertically disposed, and wherein said particles outlet is adjacent a bottom of said vessel, and wherein said shroud means completely surrounds the vertical portions of said filter element clusters.

4. Apparatus as recited in claim 1 wherein said shroud walls have openings therein extending from exteriorly of said shroud means to interiorly thereof at an angle so that gas to be filtered will pass through said shroud walls, but particles dislodged from said filters will not.

5. Apparatus as recited in claim 2 wherein said shroud means comprise a plurality of generally conical shrouds.

6. Apparatus as recited in claim 5 wherein at least some of said filter element clusters comprise a hollow duct having inner and outer surfaces; and wherein said filters are generally tubular in configuration, and are mounted to said duct in such a way that the outer surface of said duct is smooth, and does not present a substantial impediment to particles dislodged by said cleaning gas pulse from flowing down said duct to said particles outlet.

7. Apparatus as recited in claim 6 wherein said shrouds and ducts are substantially concentric with each other, and said ducts are tubes or parallelepipeds.

8. Apparatus as recited in claim 1 wherein said shroud means comprises a body made of high temperature resistant metal, or ceramic.

9. Apparatus as recited in claim 2 wherein at least one of said shrouds extends to a point significantly closer to said particles outlet than the majority of said shrouds.

10. Apparatus as recited in claim 2 further comprising a pressurized fluidized bed reactor having a discharge for gases with entrained particles and at a temperature of between about 500°–1200° C., and at a pressure of between about 2–40 bar is connected to said gas inlet to said vessel.

11. Apparatus as recited in claim 2 wherein said filters are ceramic candle filter tubes, fabric back filters, or monolithic ceramic filters.

12. Apparatus as recited in claim 2 wherein said filter element clusters are mounted by a generally horizontal support plate.

13. Apparatus for filtering gas, comprising:

a vessel having an inlet for gas with entrained particles to be filtered, an outlet for filtered gas, and an outlet for particles filtered from the gas;

a plurality of filter element clusters, each comprising a hollow duct, and each hollow duct mounting a plurality of individual filters therein, each individual filter for filtering particles from gas with entrained particles introduced into said gas inlet to said vessel, between said gas inlet and said gas outlet;

means for introducing a cleaning gas pulse to said filters to dislodge particles separated from the gas which collect on said filters; and a shroud surrounding portions of each of said hollow ducts adjacent the areas thereof from which particles will be dislodged for containing the dislodged particles and substantially preventing them from being re-entrained in gas, but rather directing the dislodged particles toward said vessel particles outlet.

14. Apparatus as recited in claim 13 wherein said ducts have inner and outer surfaces and wherein said filters are generally tubular and are mounted to said ducts in such a way that the outer surfaces of said ducts are substantially smooth so that particles dislodged from said filters flow readily down said duct outer surface toward said particles outlet.

15. Apparatus as recited in claim 14 wherein each of said shrouds is substantially concentric with its associated duct.

16. Apparatus as recited in claim 15 wherein said shrouds are tubes or parallelepipeds, and wherein said ducts are tubes or parallelepipeds.

17. Apparatus as recited in claim 13 wherein at least some of said shrouds have shroud walls with openings therein extending from a portion of said shroud in communication with said first plenum to a portion in communication with said second plenum, said openings directed so that gas to be filtered will pass through said openings, but particles dislodged from said filters by a cleaning gas pulse will not.

18. Gas filtering apparatus, comprising:

a hollow vessel having an inlet for gas with entrained particles to be filtered, an outlet for filtered gas, and an outlet for particles filtered from the gas, and a first plenum for gas to be filtered;

a second plenum for filtered gas;

a plurality of filter element clusters are mounted within said vessel, each having a plurality of filters associated therewith;

means for introducing a pulse of cleaning gas to said filter for dislodging particles filtered by said filter which have collected on said filter, so that the particles may pass through said particle outlet of said vessel;

shroud means associated with said filter element cluster for preventing re-entrainment of particles dislodged by said pulse of cleaning gas in a stream of gas to be filtered, said shroud means comprising a plurality of individual shrouds, one associated with each of said filter element clusters, and comprising means for preventing particles dislodged from one filter element cluster from passing into operative association with another filter element cluster; and wherein at least some of said filter element clusters comprise a hollow duct having inner and outer surfaces; and wherein said filters are generally tubular in configuration, and are mounted to said duct in such a way that the outer surface of said duct is smooth, and does not present a substantial impediment to particles dislodged by said cleaning gas pulse from flowing down said duct to said particles outlet.

* * * * *